United States Patent Office 3,273,066
Patented Sept. 13, 1966

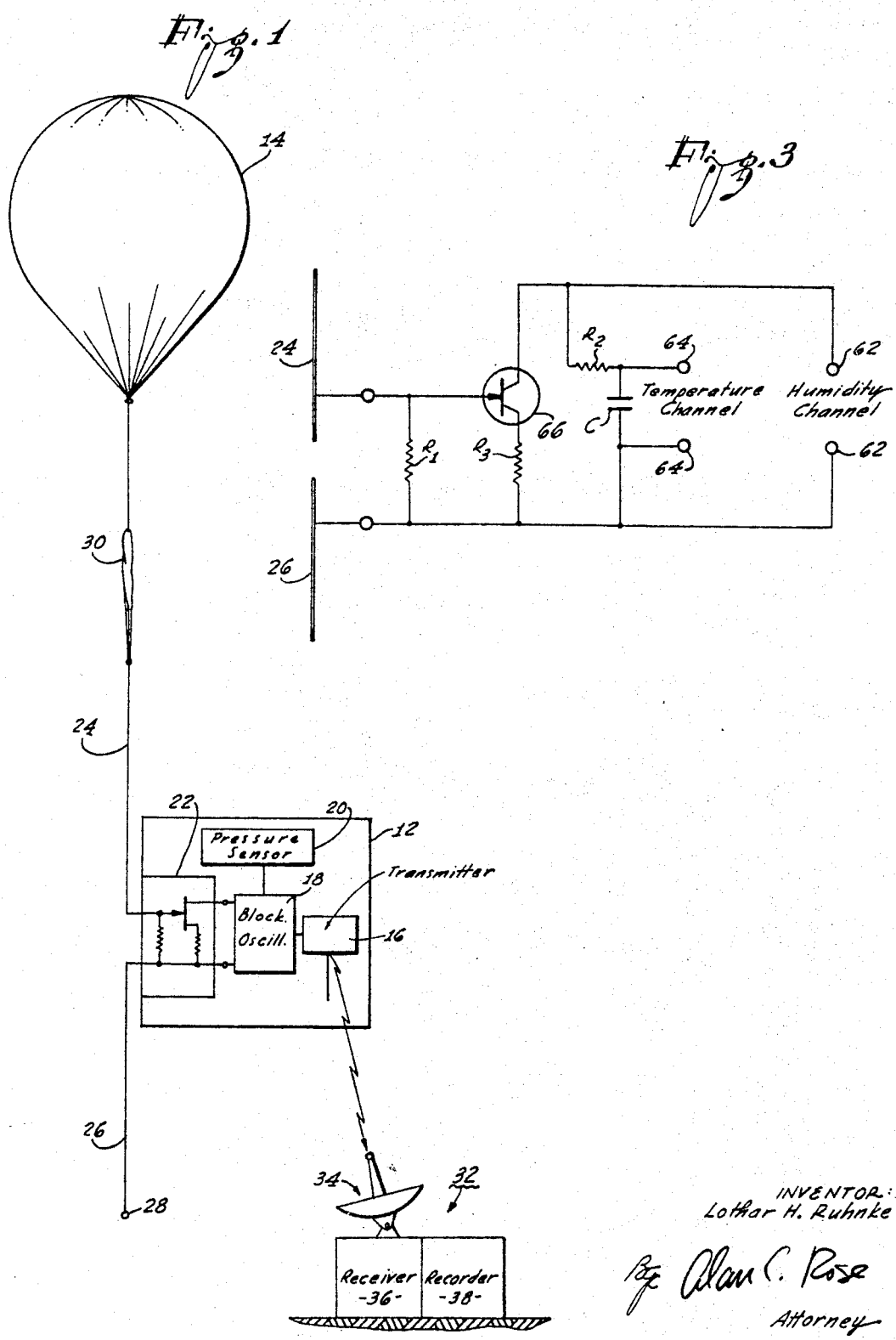

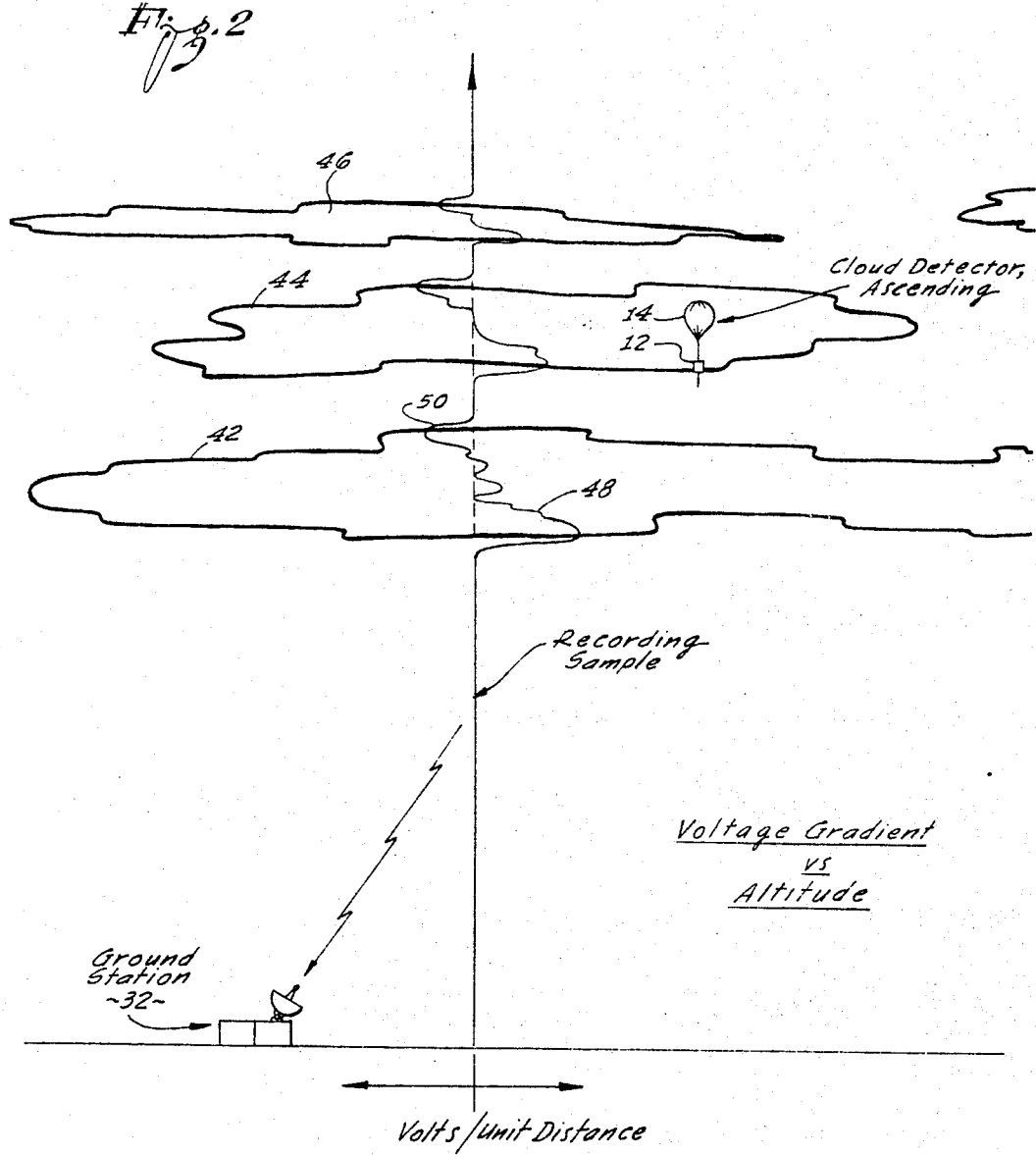

3,273,066
APPARATUS FOR DETECTING CHANGES IN THE ATMOSPHERIC ELECTRIC FIELD
Lothar H. Ruhnke, Minneapolis, Minn., assignor to Litton Systems, Inc., Beverly Hills, Calif.
Filed Dec. 20, 1963, Ser. No. 332,186
4 Claims. (Cl. 325—113)

This invention relates to a cloud detector or an apparatus for sensing electrostatic conditions in the earth's atmosphere.

Cloud detection apparatus which is presently employed is usually of the "ceilometer" type which merely measures the height of the lower surface of the clouds to indicate the ceiling conditions. One object of the present invention is to determine the location of both the top and the bottom of one or more cloud formations of the atmosphere.

While electrostatic sensors of one type or another have been proposed heretofore for use in the atmosphere, they have been so complex and expensive that they have not enjoyed widespread use. In addition, cloud radars have recently been developed, but their usefulness is limited by failures when different zones of the atmosphere contain droplets of different sizes, as discussed more fully below. Accordingly, it is another object of the present invention to simplify and reduce the cost of cloud detectors, while maintaining reliability, compatibility with existing equipment, and adequate sensitivity for all practical purposes.

In accordance with an illustrative embodiment of the present invention, a conventional U.S. Weather Bureau or U.S. Army meteoroligical radiosonde transmitter may be provided with a modulator which is controlled by a field effect transistor. The input to the field effect transistor is a dipole antenna. Each of the arms of the dipole antenna may be five to fifty feet in length, for example, and one of the dipole elements may trail the radiosonde package while the other element may extend forward in the direction of movement of the unit. When a balloon is employed to carry the cloud detector unit aloft, a weight may be attached to one of the antenna elements so it hangs below the instrument package, while the other antenna element can extend along, or even form the flexible connection between the radiosonde unit and the balloon. A receiving unit is provided to pick up the modulated signals from the radiosonde apparatus, demodulate these signals and record them. While it is contemplated that the receiver may normally be situated on the ground and receive signals from a rising radiosonde unit, the radiosonde unit could well be employed by an aircraft to determine conditions below a cloud layer. Under these conditions the receiver would be mounted on the plane and the radiosonde unit could be parachuted to the ground.

In accordance with a feature of the present invention, therefore, a system for detecting electrostatic field conditions in the atmosphere includes a transmitter, arrangements for moving the transmitter through the atmosphere, an antenna extending a substantial distance from the transmitter, and a field effect transistor connected to receive electrostatic input signals from said antenna and to modulate the output of the transmitter in accordance with voltages detected by the antenna.

In accordance with one aspect of the present invention, simplicity of circuitry and stability of operation are achieved by the use of dynamic circuitry which measures the instantaneous difference in potential between two antenna elements. Thus, a high input resistor may be connected between the input antenna elements. With this type of arrangement the instrument package must be continuously moved through the atmosphere in order to give meaningful results. Under these conditions, the recorded output indicates changes in electric fields. A constant electric field, corresponding to a linear change in potential produces no substantial output signal. It has been determined that a balloon velocity of about five meters per second will produce good results with a dipole antenna shunted by a 1,000 megohm resistor and connected to a field effect transistor as discussed in detail in the present specification. With lower velocities, a higher input impedance or greater amplification would be required, with higher velocities, such as rocket propulsion or the like, permitting even lower input impedances and simpler input circuits.

Accordingly, it is a feature of the invention that apparatus is provided for moving a radiosonde unit through the atmosphere at a predetermined rate, that two element input antenna preferably of the dipole type is provided, and that the antenna is connected to the radiosonde by simple dynamic amplification circuitry, which requires continuous movement of the apparatus to give useful output information.

The novel features which are believed to be characteristic of the invention both as to its organization and method of operation, together with further objects and advantages thereof, will be better understood from the following description considered in conjunction with the accompanying drawings in which a typical embodiment of the invention is illustrated by way of example. It is to be expressly understood, however, that the drawings are for the purpose of illustration and description only and are not intended as a definition of the limits of the invention.

In the drawing:

FIG. 1 is a schematic block diagram of a radiosonde equipment for sensing changes in the electric field of the atmosphere, and thus detecting clouds, in accordance with the present invention;

FIG. 2 is a diagrammatic showing of the record obtained under typical cloud conditions; and FIG. 3 is a circuit diagram indicating a typical arrangement of connections of a dipole antenna, a field effect transistor, and the input terminals of a standard meteorological radiosonde apparatus.

With reference to the drawings, FIG. 1 shows a radiosonde package 12 supported by a balloon 14. The radiosonde unit includes a transmitter 16, blocking oscillator 18, pressure sensor 20, and a field effect transistor unit 22. A dipole antenna having an upper element 24 and a lower element 26 is connected to the input of the field effect transistor unit 22. A small weight 28 is secured to the lower end of the antenna element 26 to hold it in the extended position. Similarly, the upper antenna element 24 extends in the other direction, and it may either form the support for the radiosonde unit 12 or may be closely associated with the supporting cable. A parachute 30 is provided for safe return of the instrument package to ground.

A ground or receiving station 32 may include an antenna 34, receiver and demodulator 36, and a recording apparatus 38.

FIG. 2 shows a typical recording of the electrostatic field obtained as the ballon 14 and instrument package 12 rise through the successive layers of clouds 42, 44, and 46, along the center line of the drawing. It is known that the electrostatic potential in the atmosphere increases from ground potential to plus 300,000 volts at elevations of about 30 miles. It is also known that the atmospheric electric field, which is the gradient of the potential, is substantially increased within clouds. As the package enters the lower edge of a cloud, the sudden increase in electric field causes a pulse of current to flow through resistor $R_1$ in one direction, and upon leaving the cloud, the sudden reduction in electric field causes an oppositely directed current pulse. This produces the positive swing shown at 48 in FIG. 2 as the unit enters the cloud and the negative peak 50 as the apparatus is rising through the upper surface of the cloud stratus 42. A similar pattern is observed as the unit goes through the higher cloud formations 44 and 46. With a knowledge of the speed of ascent of the balloon and instrument package, the location of the upper and lower surfaces of successive cloud layers may be determined by the present apparatus. Accordingly, despite the presence of a relatively low cloud layer which completely obscures other cloud formations, ground personnel may readily determine the meterological conditions relating to clouds above this low ceiling.

Returning to FIG. 1, the radiosonde equipment represented by blocks 16, 18 and 20 is well known. The meterological radiosonde system which will be taken as typical is designated by the military by the numbers AN/AMT 4B. The Army technical manual which describes this radiosonde system is identified as TM 11–2432A–TO 31M4–2AMT–11, dated June 26, 1958. The radiosonde transmitter operates at a frequency of 1680 megacycles per second. This transmitter is modulated by a blocking oscillator 18, the frequency of the blocking oscillator being controlled by the meteorological conditions which are detected. Normally, a thermistor for measuring the temperature and a humidity sensor are alternately switched to the input terminals of the blocking oscillator 18. In the present case, the cloud detector circuitry is connected to both of these terminals. The barometric pressure sensor 20 may also be retained in the unit, and it may be connected to control the frequency of the blocking oscillator 18 by a switching action as described below.

With reference to FIG. 3, the humidity channel input terminals 62 and the temperature channel input terminals 64 of the standard radiosonde unit are shown at the right-hand side of the circuit. Atmospheric electric signals received by the dipole antenna elements 24 and 26 are applied to the field effect transistor 66 and are then coupled by a suitable circuit to the input terminals 62 and 64 of the radiosonde. While other field effect transistors may be employed, type C 610 of Crystallonics, Inc., was found to be suitable from a sensitivity and reliability standpoint for the present purposes. The input to the field effect transistor is shunted by a 1,000 megohm resistor $R_1$ to stabilize the input characteristic. Suitable biasing of the transistor 66 is provided by resistor $R_3$. Because the impedance of the transistor 66 is substantially lower than that of the temperature and humidity sensors which are normally employed, a 110,000 ohm resistor in the blocking oscillator was removed and a capacitor C was connected in parallel to the input terminals. The capacitor was selected to produce a modulation frequency of approximately 100 cycles per second in the absence of an input signal. Positive and negative voltages will then raise or lower this frequency.

In the radiosonde apparatus, signals from the pressure sensor 20 are normally employed to switch from the temperature channel terminals 64 to the humidity channel terminals 62. This switch is well known in the art as a baroswitch. The barometric pressure switching action provides an indication of altitude, so it is useful to preserve this information. Accordingly, the resistor $R_2$ is employed between the transistor 66 and one terminal 64 to reduce the output signal slightly, thus changing the modulation level and preserving the pressure and thus altitude information.

With regard to the length of the dipole elements 24 and 26, the size of resistor $R_1$ and the amplification of the field effect transistor, these are fixed by several factors. First, the antenna elements should be large enough to provide a substantial input signal, but should be relatively small as compared with normal cloud thicknesses. Lengths of 5 to 50 feet for each dipole would be of the proper order of magnitude. The resistor $R_1$ was chosen to reduce the input impedance between dipoles 24 and 26 below the point where fog and dampness and the resultant shunt impedance will introduce instability into the transmitted signals. With these parameters, and a speed of ascent of the order of 5 meters per second, it was determined that a single field effect transistor provided the necessary amplification for operation with the standard radiosonde unit.

As mentioned generally above, cloud radars are subject to failure under certain atmospheric conditions. Thus, the radar return is proportional to the sixth power of the droplet or particle size, while the human eye and optical systems respond to the second power of the droplet size. With the radar return proportional to such a high power of the droplet diameter, if a radar is adjusted to pick up a cloud having large particles, other clouds having small size particles are not detected. The present electrostatic system, however, responds in a manner which is nearly the same as the optical response, and therefore does not fail under atmospheric conditions where different size droplets or particles are present in successive clouds.

It is to be understood that the above described arrangements are illustrative of the application of the principles of the invention. Numerous other arrangements within the scope of the invention may be devised by those skilled in the art. Thus, by way of example and not of limitation, a somewhat different shape of antenna could be employed to pick up electrostatic field variations and apply them to the field effect transistor, an inherently stabilized transistor may be used, and the instrument package may be carried by rocket or other suitable propulsion arrangements than the balloon shown in the drawings. Accordingly, it is evident that various changes may be made in the present invention without departing from the spirit of the invention as defined in the present claims.

What is claimed is:
1. An apparatus for sensing electrostatic conditions in the atmosphere comprising:
   a radiosonde apparatus including means for modulating the output frequency thereof, said means including an R-C circuit;
   a pair of probes positioned in respectively different locations in the atmosphere with respect to said radiosonde;
   a field effect transistor having its drain and gate terminals connected across said pair of probes and having its source and drain terminals connected in series with the resistance of said R-C circuit to modulate said radiosonde; and
   a stabilizing high resistance connected across the two probes and across said gate and drain terminals of said transistor.

2. In an apparatus for sensing atmospheric electrostatic field conditions;
   a balloon;
   an instrument package connected to and spaced from said balloon, said instrument package including a transmitter, means including an R-C circuit for modulating said transmitter, and a field effect transistor having source and drain terminals connected in series with the resistance in said R-C circuit to modulate said transmitter;
   antenna means including an antenna and resistance means connected across said antenna, said resistance means also being connected across the gate and the drain of said field effect transistor, said antenna extending upward from said package toward said balloon and downwardly from said package for applying signals to said field effect transistor in response to said field conditions to render said modulating means responsive to said field conditions.

3. An apparatus for sensing changes of the atmospheric electric field at cloud boundaries, which comprises:
   a blocking oscillator-type modulated radiosonde including fixed resistance means and capacitance means connected in parallel with said fixed resistance means, said capacitance means being effective to discharge through said resistance means to control the modulation of said radiosonde;

dipole antenna means responsive to changes of the atmospheric electric field for producing a signal indicative of said changes;

resistance means connected across said dipole antenna means; and a field effect transistor having source and drain terminals connected in series with said fixed resistance means and a gate terminal connected to said dipole antenna means for reception of said signal, said field effect transistor being responsive to said signal for varying the rate of discharge of said capacitance means to cause the blocking oscillator to modulate said radiosonde in accordance with the second changes in the atmospheric electric field.

4. An apparatus for sensing changes of the atmospheric electric field at cloud boundaries, which comprises:

radiosonde means including a blocking oscillator having fixed resistance means and capacitance means connected in parallel with said fixed resistance means, said capacitance means being effective to discharge through said resistance means to control the frequency of oscillation of said blocking oscillator;

dipole antenna means responsive to changes of the atmospheric electric field for producing a signal indicative of said changes;

resistance means connected across said dipole antenna; and a field effect transistor having source and drain terminals connected in series with said fixed resistance means and a gate terminal connected to said dipole antenna means for reception of said signal, said field effect transistor being responsive to said signal for varying the rate of discharge of said capacitance means to control the frequency of oscillation of said blocking oscillator in accordance with the sensed changes in the atmospheric electric field.

References Cited by the Examiner

UNITED STATES PATENTS

| 2,463,527 | 3/1949 | Dunmore | 325—113 |
| 3,038,154 | 6/1962 | Zworykin et al. | 325—113 XR |
| 3,056,888 | 10/1962 | Atalla | 307—88 |
| 3,062,043 | 11/1962 | Marsh et al. | 340—193.2 |

DAVID G. REDINBAUGH, *Primary Examiner.*

JOHN W. CALDWELL, *Examiner.*